C. H. Brown,
Friction Clutch.
N° 41,829. Patented Mar. 8, 1864.
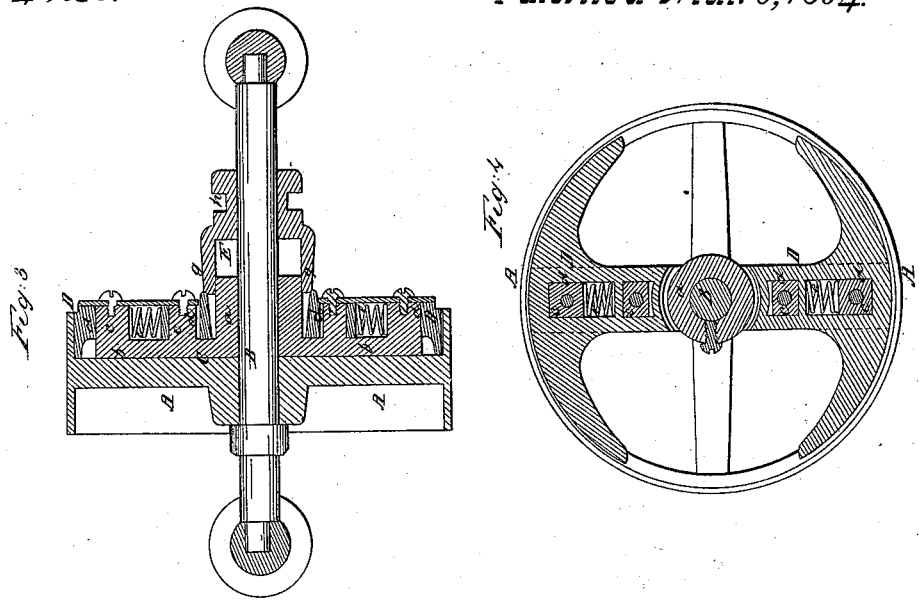
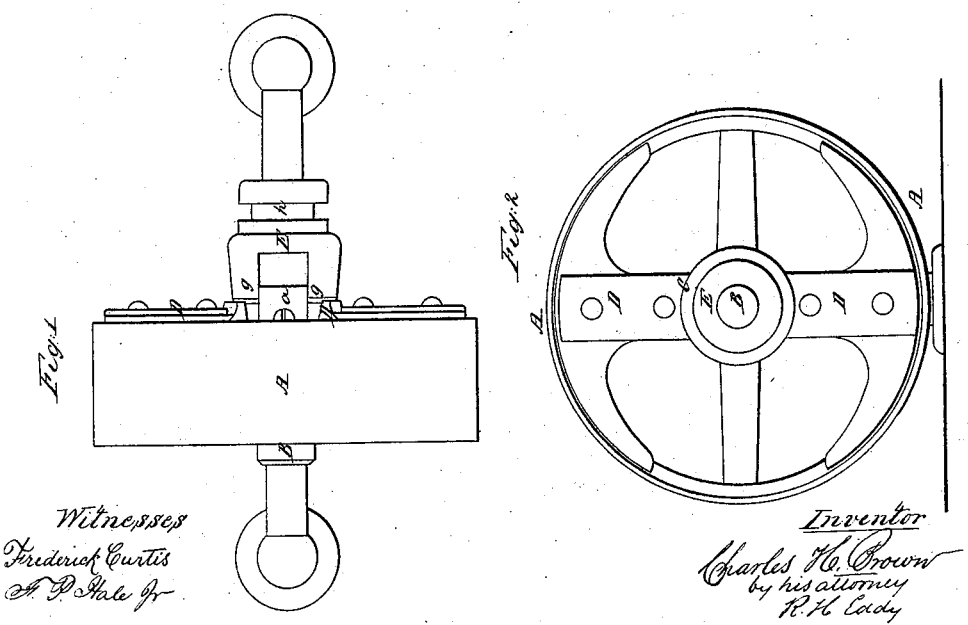
Witnesses
Frederick Curtis
F. P. Hale Jr
Inventor
Charles H. Brown
by his attorney
R. H. Cady

UNITED STATES PATENT OFFICE.

CHARLES H. BROWN, OF FITCHBURG, MASSACHUSETTS.

IMPROVEMENT IN FAST-AND-LOOSE PULLEYS.

Specification forming part of Letters Patent No. 41,829, dated March 8, 1864.

*To all whom it may concern:*

Be it known that I, CHARLES H. BROWN, a resident of Fitchburg, in the county of Worcester and State of Massachusetts, have invented an Improved Fast-and-Loose Pulley for Machines of Various Kinds; and I do hereby declare the same to be fully described in the following specification and represented in the accompanying drawings, of which—

Figure 1 denotes a top view, Fig. 2 an end elevation, Fig. 3 a horizontal section, and Fig. 4 a vertical section, of it.

In the drawings, A denotes a common pulley or band-wheel so fitted to a shaft, B, as to be capable of freely revolving thereon.

Within the pulley, and alongside of its hub, there is arranged, as shown in Fig. 3, a brake-supporter, C, which consists of a hub, $a$, and two flat arms, $b\ b$, extending in opposite directions from the hub.

From one side of each arm of the brake-supporter C two square studs, $c\ c$, extend and pass through slots $d\ d$ of one of two sliding brakes, D D, which are formed and arranged within the pulley, as shown in the drawings. There is a small helical spring, $e$, placed in one of the slots of each brake, and so as to operate to force the brake inward or away from the inner surface of the rim of the pulley A.

The hub of the brake-supporter is embraced by two wedges or tapering projections, $g\ g$, which extend from a cylinder or slider, E, and between the said hub and the inner extremities of the brakes in manner as shown in the drawings. The said cylinder is to be so applied to the shaft B as to be capable of sliding longitudinally thereon in directions toward and away from the pulley, the cylinder having around and in its periphery a groove, $h$, which is intended to receive a "shipper" or lever for effecting the endwise movements of the cylinder and its wedges or tapering projections.

On pressing the cylinder E toward the pulley the wedges $g\ g$, by their action against the brakes, will crowd them outward against the inner surface of the rim of the pulley, and thereby create such a friction between the brakes and the pulley as will cause the pulley while in revolution, to revolve the shaft. By reversing the motion of the cylinder—that is, by sliding it backward on the shaft—the wedges will be retracted and the springs $e\ e$ will force the brakes out of contact with the wheel, which under such circumstances, will revolve freely on the shaft without producing any rotary motion of it.

I do not claim a loose pulley arranged on a shaft and provided with brakes and means of putting brakes into and out of action with respect to the pulley, and so as to cause the pulley either to revolve freely on its shaft or to make the shaft revolve.

In simplicity of construction, and ease and correctness of operation my invention has many important advantages over others of like character.

I claim—

The fast-and-loose pulley A, sliding brakes D D, springs $e\ e$, wedges $g\ g$, and brake-supporter C, combined and arranged as described, and for the purposes specified.

CHARLES H. BROWN.

Witnesses:
C. H. B. SNOW,
JOHN F. BROWN.